United States Patent
Shih et al.

(10) Patent No.: US 9,418,085 B1
(45) Date of Patent: Aug. 16, 2016

(54) AUTOMATIC TABLE SCHEMA GENERATION

(71) Applicant: Amazon Technologies, Inc., Reno, NV (US)

(72) Inventors: Kathryn Marie Shih, Seattle, WA (US);
Richard Jeffrey Cole, Seattle, WA (US);
Nachi Govindasamy, Bothell, WA (US);
Sudheer Tumuluru, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 294 days.

(21) Appl. No.: 13/798,264

(22) Filed: Mar. 13, 2013

(51) Int. Cl.
*G06F 17/30* (2006.01)

(52) U.S. Cl.
CPC .... *G06F 17/30292* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 7,917,463 | B2 | 3/2011 | Dagum et al. |
| 8,190,610 | B2 | 5/2012 | Dasdan et al. |
| 2001/0056504 | A1* | 12/2001 | Kuznetsov .................. 709/310 |
| 2002/0069272 | A1* | 6/2002 | Kim et al. ................... 709/221 |
| 2007/0061704 | A1* | 3/2007 | Simova et al. .............. 715/512 |
| 2008/0091409 | A1* | 4/2008 | Anderson ....................... 704/9 |
| 2009/0307461 | A1* | 12/2009 | Nevarez et al. ............. 711/203 |
| 2011/0252073 | A1* | 10/2011 | Pauly ........................... 707/812 |

OTHER PUBLICATIONS

IBM Dictionary of Computing, McGraw-Hill Inc, 1993, pp. 115, 679, 680.*
"Tutorial—Apache Hive," Apache Software Foundation last edited by Steven Wong, Mar. 21 2012. from https://cwiki.apache.org/confluence/display/Hive/Tutorial, pp. 1-20.

* cited by examiner

*Primary Examiner* — Wilson Lee
(74) *Attorney, Agent, or Firm* — Robert C. Kowert; Meyertons, Hood, Kivlin, Kowert & Goetzel, P.C.

(57) ABSTRACT

Methods and systems for automatic table schema generation are disclosed. A description of a data source is received. A table definition is determined based on the description of the data source, wherein the table definition maps the data source to one or more columns of an output table. A parser for the data source is selected from a set of predefined parsers based on the description of the data source. A query against the data source is received. One or more elements of data responsive to the query are retrieved from the data source using the selected parser. The one or more elements are transformed into the output table based on the table definition.

22 Claims, 9 Drawing Sheets

AUTOMATIC TABLE SCHEMA GENERATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

As the technological capacity for organizations to create, track, and retain information continues to grow, a variety of different technologies for managing and storing the rising tide of information have been developed. Distributed storage systems, for example, provide clients with many different configurations of hardware and software to manage stored information. However, the increasing amounts of data that organizations must store and manage often correspondingly increase both the size and complexity of data storage and management technologies, which in turn escalate the cost of maintaining the information. New technologies seek to reduce both the complexity and storage requirements of maintaining data while simultaneously improving the efficiency of data storage and data management.

Figure 1:
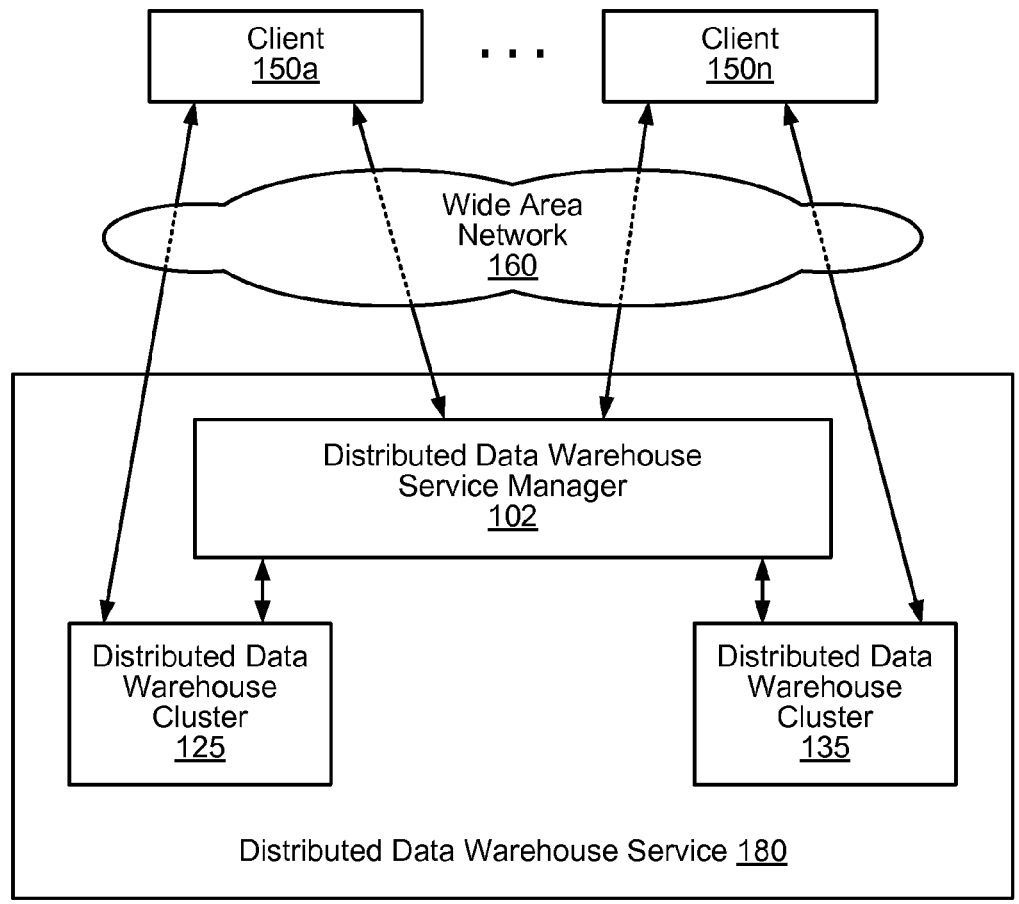
FIG. 1 illustrates an example distributed data warehouse service that may provide data management services to clients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for automatic table schema generation are described. Using the systems and methods described herein, a table schema associated with a data source may be automatically generated. The table schema may be automatically generated based on a high-level description of the data source provided by a client. A parser for the data source and any optional parameters for the parser may be automatically selected, e.g., based on the high-level description of the data source provided by the client. In one embodiment, aspects of the table schema may be generated and/or the parser may be selected through inspection of the contents of the data source. A table creation command including the table schema and/or parser selection may be automatically generated and executed. When a query against the data source is executed, the selected parser may be used to retrieve the results from the data source or add data to the data source. The results of the query may be mapped to an output table using the table schema.

Distributed Data Warehouse Management

It is not uncommon for entities to collect large amounts of data which may require subsequent storage or management. Although some entities may wish to implement their own data management system for this data, it is increasingly apparent that obtaining data management services may prove a more efficient and cost effective option for those entities who do not wish to manage their own data. For example, a small business may wish to maintain sales records and related data for future data analysis. Instead of investing directly in the data management system to maintain the data and the expertise required to set up and maintain the system, the small business may alternatively find it more efficient to contract with a data management service to store and manage their data. A data management service, such as a distributed data warehouse system discussed below with regard to FIGS. 1 and 2, may offer clients a variety of different data management services, according to their various needs. In some cases, clients may wish to store and maintain large of amounts data, such as sales records marketing, management reporting, business process management, budget forecasting, financial reporting, website logs and analytics, or many other types or kinds of data.

As discussed above, various clients (e.g., customers, organizations, entities, or users) may wish to store and manage data using a data management service. FIG. 1 illustrates an example distributed data warehouse service that may provide data management services to clients, according to some embodiments. Specifically, distributed data warehouse clusters may respond to store requests (e.g., to write data into storage) or queries for data (e.g., such as a Structured Query Language request (SQL) for select data), along with many other data management or storage services.

Multiple users or clients may access a data warehouse cluster to obtain data warehouse services. Clients may include users, client applications, and/or data warehouse service subscribers, according to some embodiments. In this example, each of the clients 150a through 150n is able to access distributed data warehouse clusters 125 and 135 respectively in the distributed data warehouse service 180. Each of distributed data warehouse clusters 125 and 135 may include two or more nodes on which data may be stored on behalf of the clients 150a through 150n who have access to those clusters. Although two clients 150a and 150n and two distributed data warehouse clusters 125 and 135 are illustrated, it is contemplated that any suitable number of clients and clusters may be used with the techniques described herein.

Figure 7:
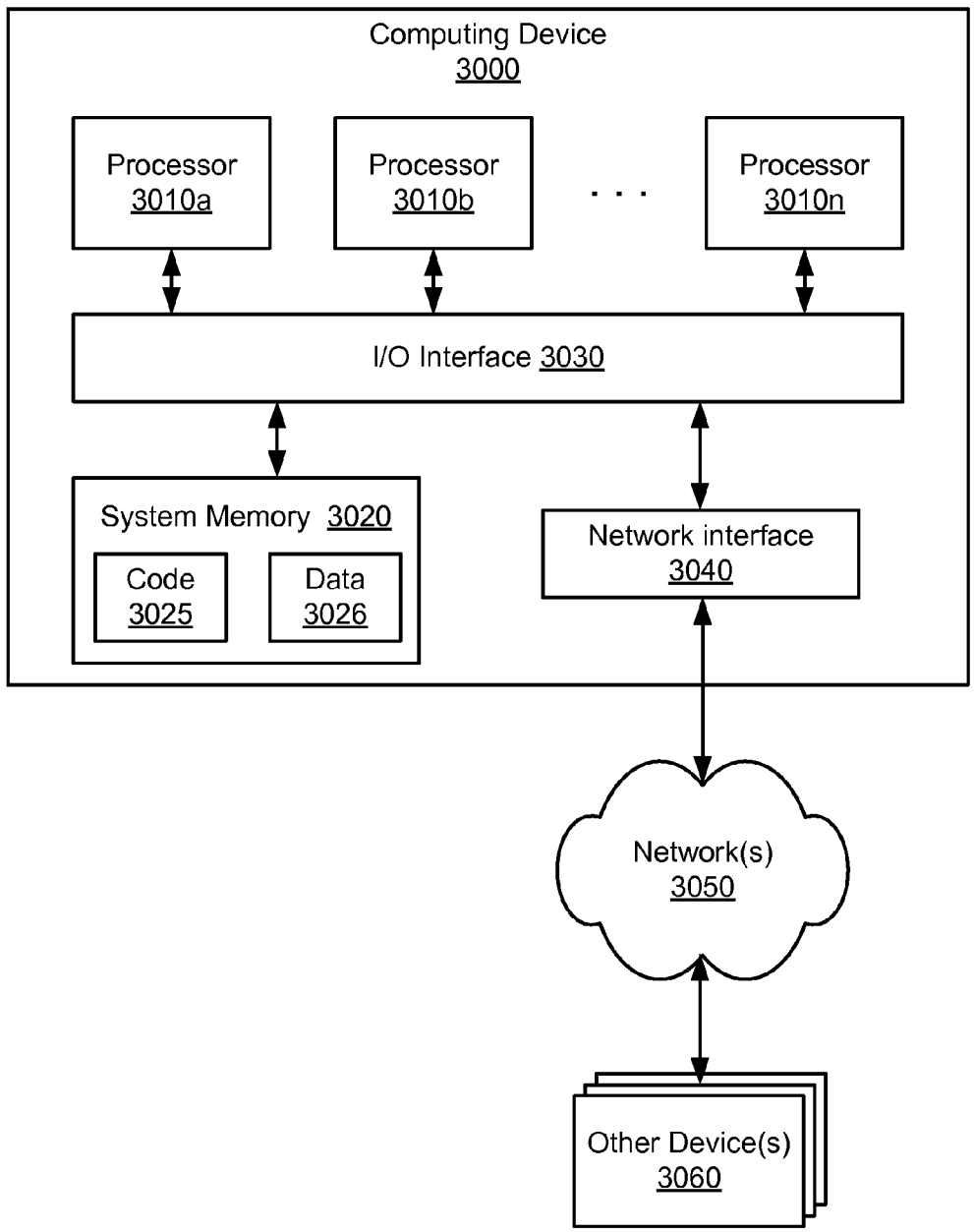
FIG. 7 illustrates an example of a computing device that may be used in some embodiments.

A client, such as one of clients 150a through 150n, may communicate with a distributed data warehouse cluster 125 or 135 via a desktop computer, laptop computer, tablet computer, personal digital assistant, mobile device, server, or any other computing system or other device, such as computer system 3000 described below with regard to FIG. 7, configured to send requests to the distributed data warehouse clusters 125 and 135 and/or receive responses from the distributed data warehouse clusters 125 and 135. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 102.

Clients 150a through 150n may communicate with distributed data warehouse clusters 125 and 135, hosted by distributed data warehouse service 180 using a variety of different communication methods, such as over Wide Area Network (WAN) 160 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 150a may communicate via a desktop computer running a local software application, such as a web-client, that is configured to send hypertext transfer protocol (HTTP) requests to distributed data warehouse cluster 125 over WAN 160. Responses or other data sent to clients may be formatted in similar ways.

In at least some embodiments, a distributed data warehouse service, as indicated at 180, may host distributed data warehouse clusters, such as clusters 125 and 135. The distributed data warehouse service 180 may provide network endpoints to the clients 150a to 150n of the clusters which allow the clients 150a through 150n to send requests and other messages directly to a particular cluster. As noted above, network endpoints, for example may be a particular network address, such as a URL, which points to a particular cluster. For example, client 150a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as distributed data warehouse cluster 125 and 135, may be made up of one or more nodes. These clusters may include different numbers of nodes. A node may be implemented using a server, desktop computer, laptop, or, more generally any other computing device, such as those described below with regard to computer system 3000 in FIG. 7. In some embodiments, the number of nodes in a distributed data warehouse cluster may be modified, such as by a cluster scaling request. Nodes of a distributed data warehouse cluster may implement one or more data slices for storing data. These data slices may be part of storage devices, such as the disk storage devices discussed below with regard to FIG. 2. Clusters may be configured to receive requests and other communications over WAN 160 from clients, such as clients 150a through 150n. A cluster may be configured to receive requests from multiple clients via the network endpoint of the cluster.

In some embodiments, distributed data warehouse service 180 may be implemented as part of a web service that allows users to set up, operate, and scale a data warehouse in a cloud computing environment. The distributed data warehouse clusters hosted by the web service may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 180 may provide clients (e.g., subscribers to the data warehouse service provided by the distributed data warehouse system) with data storage and management resources that may be created, configured, managed, scaled, and terminated in response to requests from the client. For example, in some embodiments, distributed data warehouse system 180 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 180 may be implemented by a large collection of computing devices, such as customized or off-the-shelf computing systems, servers, or any other combination of computing systems or devices, such as the various types of devices described below with regard to FIG. 7. Different subsets of these computing devices may be controlled by distributed data warehouse service manager 202. Distributed data warehouse service manager 102, for example, may provide a cluster control interface to clients, such as clients 150a through 150n, or any other clients or users who wish to interact with the distributed data warehouse clusters managed by the distributed data warehouse service manager 102, which in this example illustration would be distributed data warehouse clusters 125 and 135. For example, distributed data warehouse service manager 102 may generate one or more graphical user interfaces (GUIs) for storage clients, which may then be utilized to select various control functions offered by the control interface for the distributed data warehouse clusters hosted in the distributed data warehouse service 180.

Figure 2:
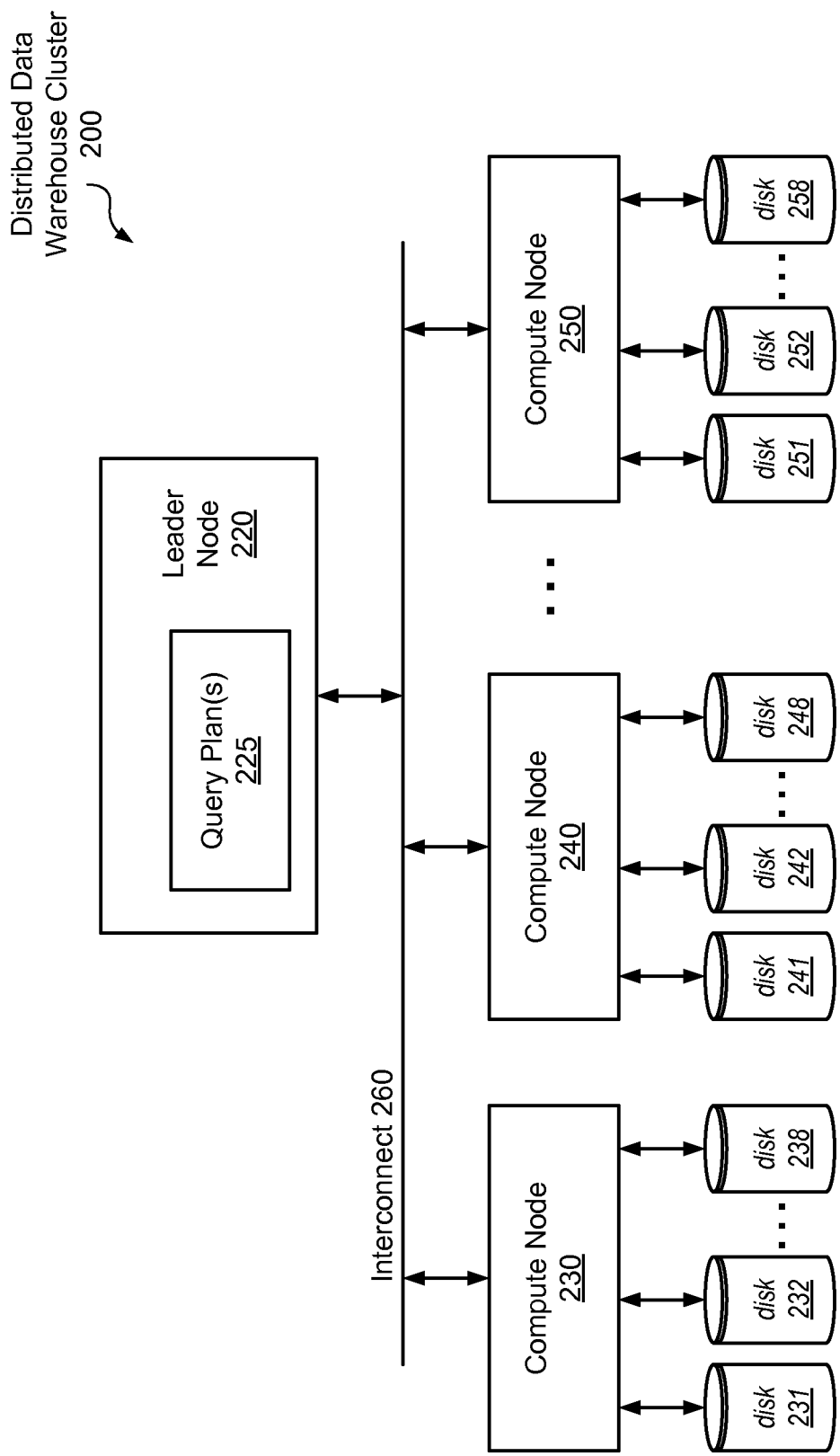
FIG. 2 is a block diagram illustrating a distributed data warehouse cluster in a distributed data warehouse service, according to one embodiment.

FIG. 2 is a block diagram illustrating a distributed data warehouse cluster in a distributed data warehouse service, according to one embodiment. As illustrated in this example, a distributed data warehouse cluster 200 may include a leader node 220 and compute nodes 230, 240, and 250, which may communicate with each other over an interconnect 260. Leader node 220 may generate and/or maintain one or more query plans 225 for executing queries on distributed data warehouse cluster 200. As described herein, each node in a distributed data warehouse cluster may include multiple disks on which data blocks may be stored on behalf of clients (e.g., users, client applications, and/or distributed data warehouse service subscribers). In this example, compute node 230 includes disks 231-238, compute node 240 includes disks 241-248, and compute node 250 includes disks 251-258. In some embodiments, a component of the distributed data warehouse cluster (or the distributed data warehouse system of which it is a component) may support load balancing, using any of a variety of applicable load balancing techniques. For example, in some embodiments, leader node 220 may include a load balancing component (not shown).

In at least some embodiments, distributed data warehouse cluster 200 may be implemented as part of the web based data warehouse service, such as the one described above, and includes a leader node 220 and multiple compute nodes, such as compute nodes 230, 240, and 250. The leader node 220 may manage communications with clients, such as clients 150*a* through 150*n* discussed above with regard to FIG. 1. For example, a leader node may be a server that receives requests from various client programs (e.g., applications) and/or subscribers (users), then parses them and develops an execution plan (e.g., query plan(s) 225) to carry out the associated database operation(s). More specifically, the leader node may develop the series of steps necessary to obtain results for complex queries and joins. Leader node 220 may also manage the communications among compute nodes 230 through 250 instructed to carry out database operations for data stored in the distributed data warehouse cluster 200. For example, compiled code may be distributed by leader node 220 to various ones of the compute nodes 230 to 250 to carry out the steps needed to perform queries, and intermediate results of those queries may be sent back to the leader node 220. Leader node 220 may receive data and query responses or results from compute nodes 230, 240, and 250. A database schema and/or other metadata information for the data stored among the compute nodes, such as the data tables stored in the cluster, may be managed and stored by leader node 220.

Distributed data warehouse cluster 200 may also include compute nodes, such as compute nodes 230, 240, and 250. These one or more compute nodes, may for example, be implemented on servers or other computing devices, such as those described below with regard to computer system 3000 in FIG. 7, and each may include individual query processing "slices" defined, for example, for each core of a server's multi-core processor. Compute nodes may perform processing of database operations, such as queries, based on instructions sent to compute nodes 230, 240, and 250 from leader node 220. The instructions may, for example, be compiled code from execution plan segments and steps that are executable by the particular data compute node to which it is sent. Data compute nodes may send intermediate results from queries back to leader node 220 for final aggregation. Each data compute node may be configured to access a certain memory and disk space in order to process a portion of the workload for a query (or other database operation) that is sent to one or more of the compute nodes 230, 240 or 250.

Disks, such as the disks 231 through 258 illustrated in FIG. 2, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system.

Although FIGS. 1 and 2 have been described and illustrated in the context of a distributed data warehouse system, the various components illustrated and described in FIGS. 1 and 2 may be easily applied to other data management systems that provide data management and/or storage services for a storing data in a data store. Moreover, the configuration of components, systems, or devices show are not limiting as to other possible configurations. FIG. 2, for example, illustrates a distributed data warehouse cluster 200 including a leader node, but in some embodiments a distributed data warehouse cluster may operate without a leader node. As such, FIGS. 1 and 2 are not intended to be limiting as to embodiments of a distributed data warehouse cluster, nor limiting as a description of a data storage and management cluster.

In one embodiment, the distributed data warehouse service 180 may be implemented using a computing environment that supports data-intensive distributed applications based on the Hadoop software framework. The Hadoop environment may support the execution of applications on large clusters of commodity hardware while providing both reliability and data motion to applications. The Hadoop environment may implement a computational paradigm referred to as map/reduce, in which an application is divided into many small fragments which may be executed or re-executed on any node in the cluster. The Hadoop environment may also provide a distributed file system that stores data on the compute nodes and provides very high aggregate bandwidth across the cluster. Queries against data sources may be converted to map/reduce jobs for execution within the Hadoop environment.

Automatic Table Schema Generation

As discussed above with respect to FIGS. 1 and 2, the distributed data warehouse service 180 may provide facilities for querying data that resides in distributed storage. The query may be received from a client and may be expressed in a suitable query language, e.g., SQL or an SQL-like query language. In executing the query against relevant elements of the distributed storage, the distributed data warehouse service 180 may extract, transform, and load the resulting data. The data resulting from the query may be expressed as a table with one or more columns and one or more rows. The data may then be used as input for any suitable operation. Usage examples for data retrieved in this manner are discussed with respect to FIG. 6.

In some embodiments, a client may provide a high-level description of an input data source instead of a complex table creation command (e.g., CREATE TABLE or CREATE EXTERNAL TABLE) that includes a table definition (which would map fields of the input data source to columns of an SQL-like table) and an identification of parser (e.g., a serializer/deserializer) for the input data source. In one embodiment, the high-level description of the input data source may include a brief description of the data type of the data source, e.g., "csv" (comma-separated values), "json" (JavaScript Object Notation), etc. In one embodiment, the high-level description may also include a listing of column names and column data types for elements or records in the input data source. Based on the high-level description supplied by the client, the distributed data warehouse service 180 may automatically generate a table definition (also referred to herein as a table schema) and/or select an appropriate parser for use with the input data source. The table definition and selected parser may be part of a table creation command that is automatically generated based on the high-level description, e.g., when the data source is added to the distributed data warehouse service 180. A client-submitted query may then be performed on the data source, and the resulting data may be retrieved using the parser and mapped to a table format defined by the table schema. In one embodiment, a correspondence between a data source and a corresponding table definition and parser may be stored once and then retrieved for new queries against the data source.

Without the automatic table schema generation techniques disclosed herein, a client who wished to create a table for a weblog might need to write a table creation command that included a table definition (e.g., an identification of the column names and associated data types for the table resulting from the query), a parser for the weblog data source, and optional parameters for the parser. For example, the client might need to write a CREATE TABLE or CREATE EXTERNAL TABLE command (or any other suitable table creation command compatible with an SQL-like language) such as the following:

```
CREATE TABLE weblog (
    host STRING,
    identity STRING,
    user STRING,
    time STRING,
    request STRING,
    status STRING,
    size STRING,
    referer STRING,
    agent STRING)
```

```
ROW FORMAT SERDE '[...]serde2.RegexSerDe'
WITH SERDEPROPERTIES (
    "input.regex" = "([^ ]*) ([^ ]*) ([^ ]*) (-|\\[^\\]*\\]) ([^ \"]*|\"[^\"]*\")
    (-|[0-9]*) (-|[0-9]*)(?: ([^ \"]*|\".*\") ([^ \"]*|\".*\"))?",
    "output.format.string" = "%1$s %2$s %3$s %4$s %5$s
    %6$s %7$s %8$s %9$s")
STORED AS TEXTFILE;
```

Using the systems and methods disclosed herein, however, a table creation command (e.g., CREATE TABLE or CREATE EXTERNAL TABLE) including a table definition, an identification of a suitable parser, and any optional parameters for the parser may be generated and executed automatically, e.g., based on the high-level description of the data source provided by the client. In one embodiment, the table definition (e.g., "host STRING, identity STRING, user STRING, time STRING, request STRING, status STRING, size STRING, referer STRING, agent STRING") may be generated automatically based on the high-level description of the data source provided by the client. Additionally, an appropriate parser (e.g., "[ . . . ]serde2.RegexSerDe") may be selected automatically based on the high-level description of the data source provided by the client, i.e., without the parser being specified by the client. In one embodiment, parameters for the parser (e.g., the "input.regex" and/or "output.format.string" parameters shown in the above example) may also be selected automatically based on the high-level description of the data source provided by the client, i.e., without the parameters being specified by the client.

The execution of the table creation command may result in the storing of a table schema and parser selection (including any optional parser parameters) for the data source. The data source associated with the table creation command may then be queried by the client using any suitable SQL-like query. In one embodiment, the table creation command may be executed only once for a particular data source, and many queries may then be executed using the table schema and parser selection associated with the table creation command. In some embodiments, compute jobs other than queries may be performed using the table schema and/or parser selection that are automatically generated. Additionally, various types of compute jobs may be performed using the results of queries performed using an automatically generated table schema. Examples of such compute jobs are discussed below with respect to FIG. 6.

In some embodiments, the techniques described herein may be used to automatically generate and execute a command to alter an existing table, such as by adding one or more partitions. As used herein, the term "table modification command" may include commands to create a table and also commands to alter an existing table. In some embodiments, the techniques described herein may be used to generate and execute more than one table modification command relating to a single data source or to multiple data sources. In some embodiments, the selected parser(s) and table definition(s) may be used to generate multiple output tables in response to a query.

In some embodiments, the input data source may be semi-structured or unstructured data. The parser may instruct the distributed data warehouse service 180 as to how a record from the input data source should be processed. In one embodiment, a parser (i.e., SerDe) is a combination of a serializer and a deserializer. The deserializer may take a string or binary representation of a record and translate it into an object that the distributed data warehouse service 180 can then manipulate. The serializer may turn an object into something that the distributed data warehouse service 180 can write to one of the distributed data warehouse clusters. Typically, deserializers are used at query time to execute SELECT statements, while serializers are used when writing data, e.g., through an INSERT statement. In one embodiment, the selection of a parser as described herein may include the selection of one parser for input and another parser for output. In one embodiment, the distributed data warehouse service 180 may store parsers for many common data types. An appropriate parser may be retrieved and used in a query without the parser being specified by the client. A set of parsers maintained by the distributed data warehouse service 180 may include standard parsers (e.g., parsers for standard data formats) as well as custom parsers.

Figure 3A:
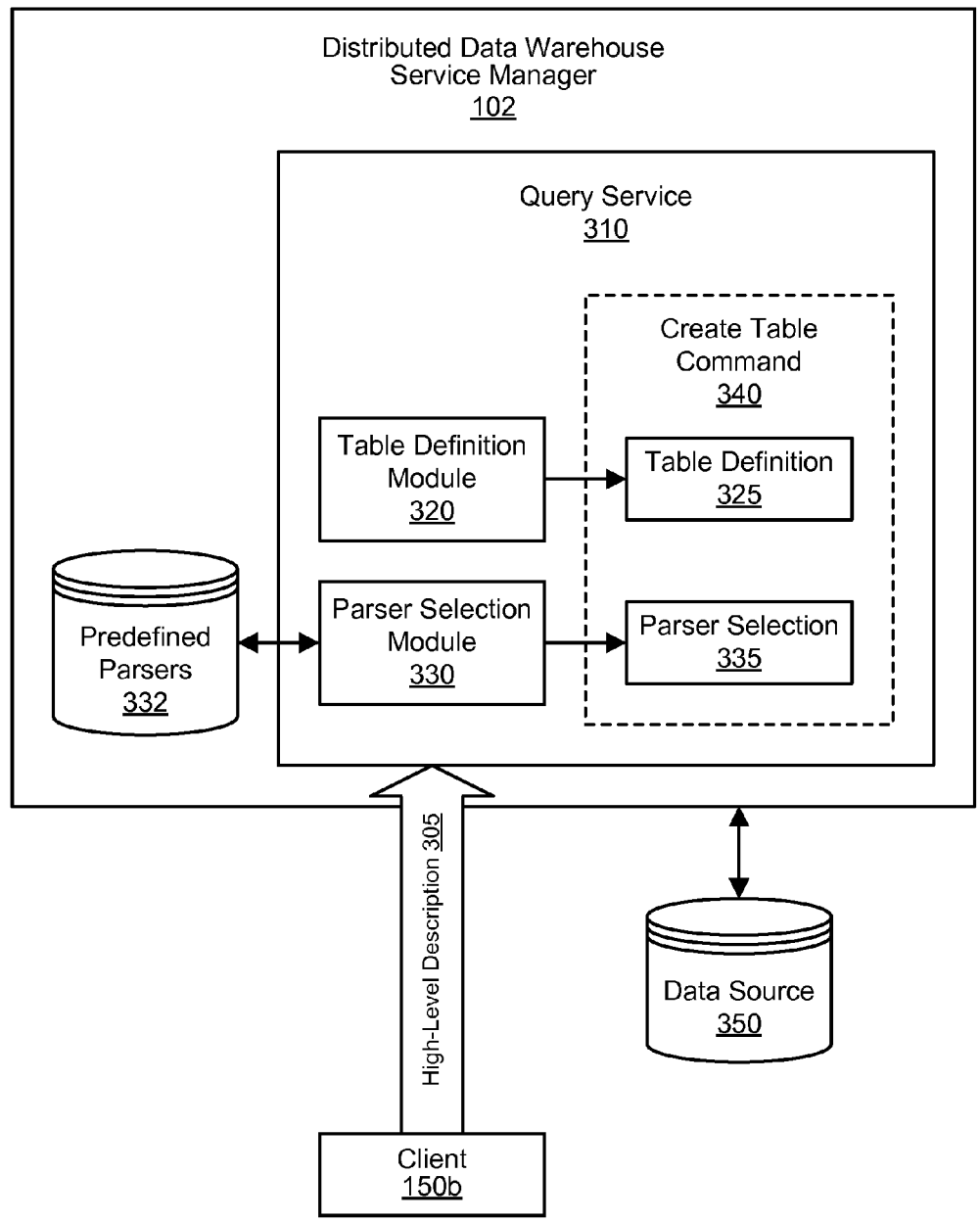
FIGS. 3A and 3B illustrate example system environments for automatic table schema generation, according to one embodiment.
Figure 3B:
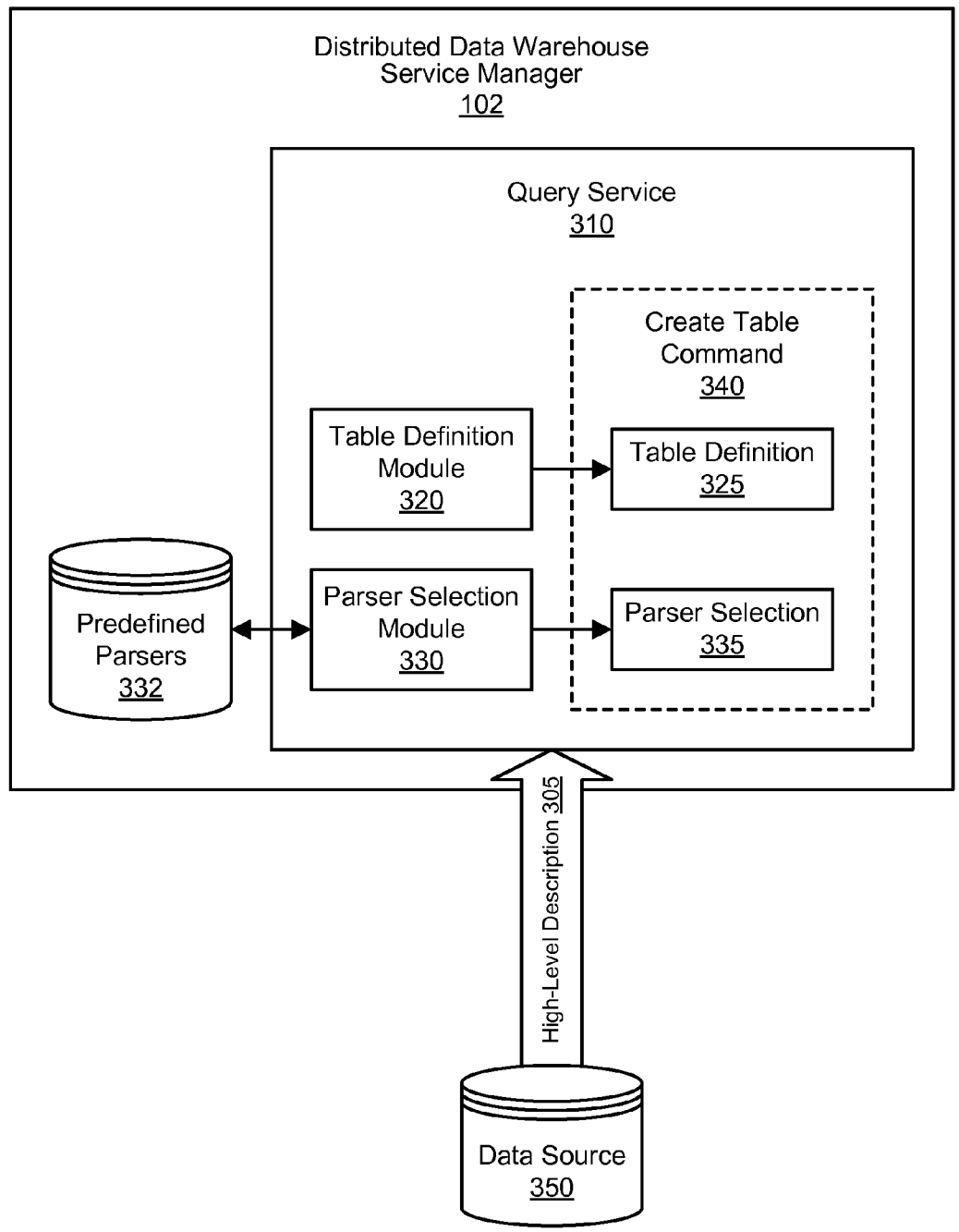

FIGS. 3A and 3B illustrate example system environments for automatic table schema generation, according to one embodiment. The example system environment may include the distributed data warehouse service manager 102. The distributed data warehouse service 180 may include a query service 310 that is configured to perform aspects of the techniques disclosed herein for automatic table schema generation. The query service 310 may include various modules, such as a table definition module 320 and a parser selection module 330. The distributed data warehouse service manager 102 may comprise one or more computing devices, any of which may be implemented by the example computing device 3000 illustrated in FIG. 7. In various embodiments, the functionality of the different services and/or modules (e.g., query service 310, table definition 320, and parser selection module 330) may be provided by the same computing device or by different computing devices. If any of the query service 310, table definition 320, and parser selection module 330 are implemented using different computing devices, then the respective computing devices may be communicatively coupled, e.g., via a network. Each of the query service 310, table definition 320, and parser selection module 330 may represent any combination of software and hardware usable to perform their respective functions, as discussed as follows.

As shown in FIG. 3A, a client 150*b* may submit a high-level description 305 of a data source 350 to the distributed data warehouse service manager 102. In one embodiment, the high-level description 305 may be submitted to the query service 310. The high-level description 305 may be submitted by the client when the client seeks to add the data source 350 to the distributed data warehouse system 180, e.g., to make the data source 350 subject to queries using an SQL-like query language. The high-level description of the data source may include data indicative of a data type of the data source 350, e.g., "csv," "json," etc. The high-level description of the data source may include data usable to create a mapping of the data in the data source to a tabular format. For example, the high-level description may include, for each of the one or more columns of the tabular format, a column name and a data type.

Based on the high-level description 305 provided by the client 150*b*, the query service may use the table definition module 320 to generate aspects of a table definition (i.e., table schema) 325 that describes a mapping of data in the data source 350 to a tabular format. Also based on the high-level description 305, the query service may use the parser selection module 330 to generate a parser selection 335 suitable for the data source 350. The parser selection 335 may be taken from a set of predefined parsers 332, including parsers for standard or common data formats and/or custom parsers (e.g., submitted by the same client 150*b* or a different client). Each parser may include functionality (e.g., program code) for reading data from and/or writing data to one or more data sources. In one embodiment, each parser may include a serializer and a deserializer. The parser selection module 330 may also generate any optional arguments or parameters for the parser. The optional arguments or parameters may be generated based on the high-level description 305. In one embodiment, the table definition 325 and parser selection 335 may be part of a create table command 340. The create table command 340 may be generated and executed by the query service to permit the querying of the data source 350.

As shown in FIG. 3B, the high-level description 305 of the data source 350 may be determined from the data source itself. In one embodiment, the high-level description 305 may be determined by the query service 310 based on inspection of all or part of the data or metadata of the data source 350. The high-level description 305 may be determined based on inspection of the data source when the client seeks to add the data source 350 to the distributed data warehouse system 180, e.g., to make the data source 350 subject to queries using an SQL-like query language. In one embodiment, the high-level description may be determined by inspecting all or part of the data or metadata in the data source, e.g., to determine the data type of the data source such as "csv," "json," etc. For example, a portion of the data source may be searched for particular strings or structural elements that are typically associated with particular data types. In one embodiment, the high-level description of the data source may include data usable to create a mapping of the data in the data source to a tabular format. For example, the high-level description may include, for each of the one or more columns of the tabular format, a column name and a data type. In one embodiment, one or more of the data types of the columns may be determined automatically by inspecting at least a portion of data in the data source. In one embodiment, the column headings may be determined automatically by inspecting the data source to find a listing of the column headings.

Based on the high-level description 305 determined through inspection of the data source 350, the query service may use the table definition module 320 to generate aspects of a table definition (i.e., table schema) 325 that describes a mapping of data in the data source 350 to a tabular format. Also based on the high-level description 305, the query service may use the parser selection module 330 to generate a parser selection 335 suitable for the data source 350. The parser selection 335 may be taken from a set of predefined parsers 332, including parsers for standard or common data formats and/or custom parsers (e.g., submitted by the same client 150*b* or a different client). Each parser may include functionality (e.g., program code) for reading data from and/or writing data to one or more data sources. In one embodiment, each parser may include a serializer and a deserializer. The parser selection module 330 may also generate any optional arguments or parameters for the parser. The optional arguments or parameters may be generated based on the high-level description 305. In one embodiment, the table definition 325 and parser selection 335 may be part of a create table command 340. The create table command 340 may be generated and executed by the query service to permit the querying of the data source 350.

In some embodiments, some aspects of the high-level description 305 of the data source 350 may be supplied by the client 150*b*, and other aspects of the high-level description 305 of the data source 350 may be determined by inspection of the data source. For example, the high-level description may be determined automatically, and the high-level description may then be presented to the client (e.g., in a graphical user interface or other suitable user interface) for ratification or modification. As another example, the high-level data type (e.g., csv, json, etc.) of the data source 350 and of individual data fields may be determined through inspection of the data, while the column names usable to create the table definition may be provided by the client 150b.

Figure 4:
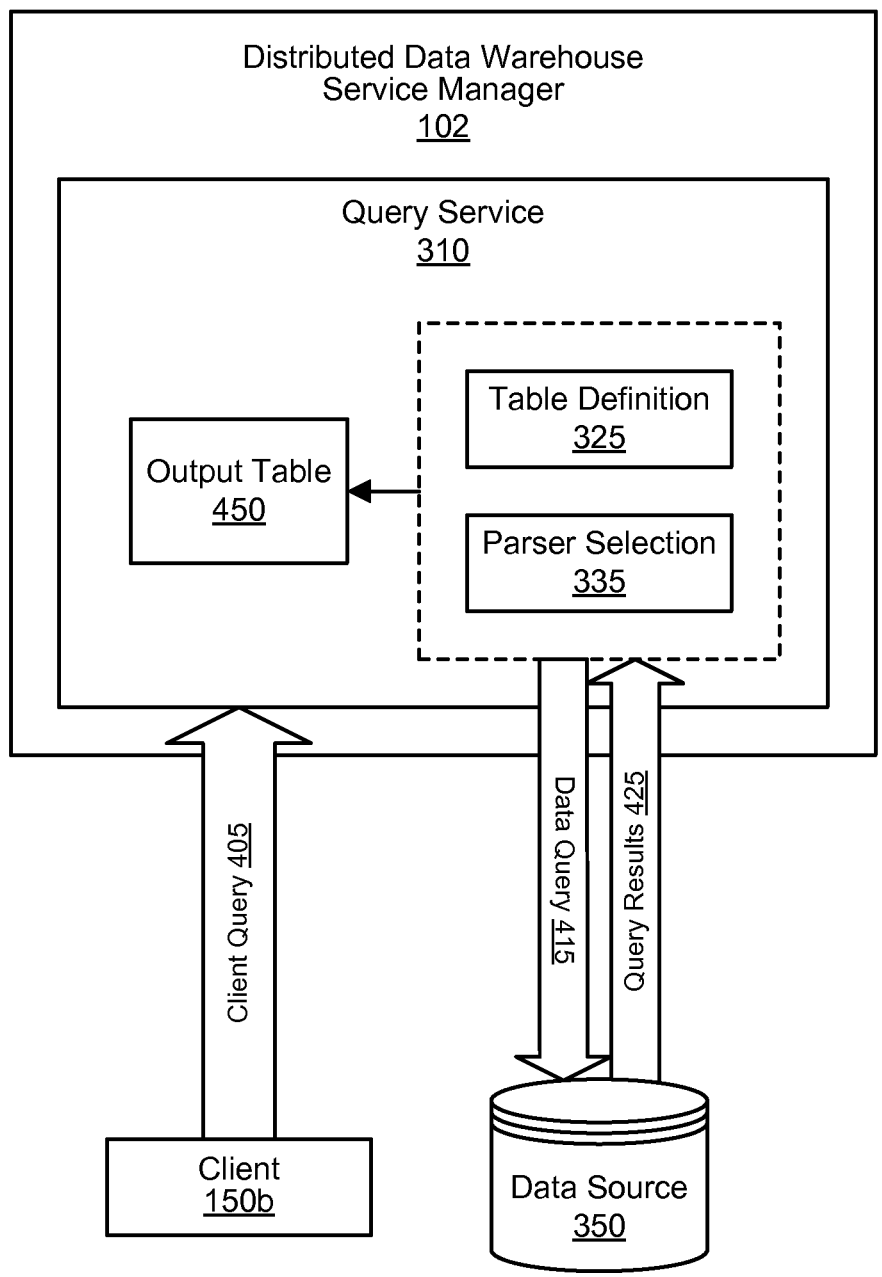
FIG. 4 illustrates an example system environment for performing a query based on automatic table schema generation, according to one embodiment.

FIG. 4 illustrates an example system environment for performing a query based on automatic table schema generation, according to one embodiment. The client 150b may submit a client query 405 to the query service 310. The client query 405 may be expressed in a query language such as SQL or any suitable equivalent. For example, the client query 405 may include a SELECT statement that seeks to obtain data having particular attributes from the data source 350. In one embodiment, the query service 310 may convert the client query 405 to a data query 415 in a form that can be processed by the data source 350, e.g., map/reduce jobs or other compute tasks. The query service may use the data query 415 to obtain query results 425 that are responsive to the client query 405.

The query results 425 may be read from the data source 350 using the selected parser 335, e.g., using the deserializer of the parser 335. If the client query includes an INSERT statement, then data may be added to the data source 350 using the serializer of the parser 335. If the query seeks to obtain data from the data source 350, then the query results 425 may be translated or converted from the native format of the data source to a tabular format using the table definition 325. The query service may generate an output table 450 that expresses the query results 425 in the tabular format. If the query seeks to add data to the data source 350, then the added data may be translated or converted from a tabular format to a format required by the data source using the table definition 325.

Figure 5A:
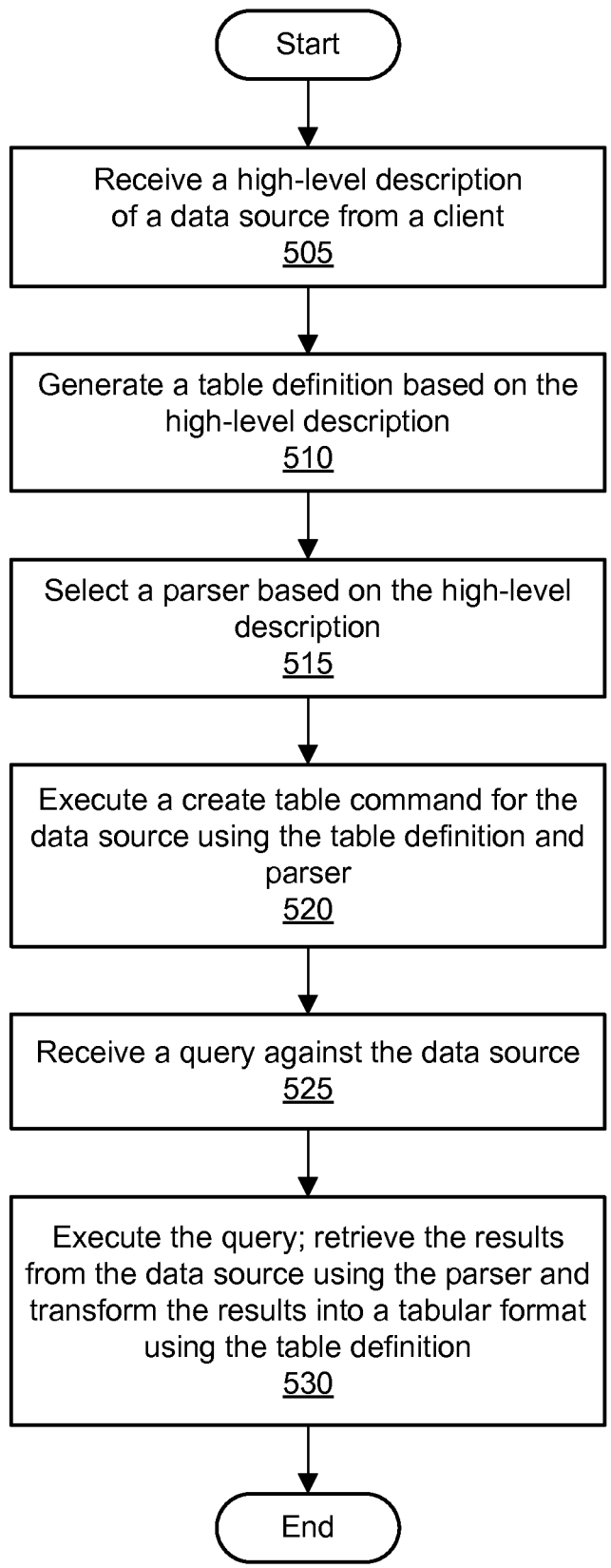
FIGS. 5A and 5B are flowcharts illustrating methods for automatic table schema generation, according to one embodiment.

FIG. 5A is a flowchart illustrating a method for automatic table schema generation, according to one embodiment. As shown in 505, a high-level description of a data source is received by the distributed data warehouse service 180. The high-level description of the data source may include data indicative of a data type of the data source, e.g., "csv," "json," etc. The high-level description of the data source may include data usable to create a mapping of the data in the data source to a tabular format. For example, the high-level description may include, for each of the one or more columns of the tabular format, a column name and a data type. In one embodiment, the high-level description may be received from a client when the data source is added to the distributed data warehouse service 180. The high-level description may be received before a query against the data source is submitted by a client.

As shown in 510, a table definition for the data source is generated. The table definition may be generated automatically based on aspects of the high-level description of the data source. The table definition may provide a mapping of fields or other elements of the data source to one or more columns of a table. Accordingly, the table definition may include a column name and a data type for each of the one or more columns. In one embodiment, the table definition is determined based on one or more column names and/or column data types received from the client.

As shown in 515, a parser for the data source is selected. The parser may be selected from a set of predefined parsers. The parser may be selected based on the high-level description of the data source. The parser may include a serializer and a deserializer for the data source. In one embodiment, one or more parameters or arguments for the parser may also be selected based on the high-level description of the data source.

In one embodiment, the table definition, the selected parser, and the optional parameters or arguments for the parser may be generated as part of a create table command. As shown in 520, the create table command may be executed by the distributed data warehouse service 180. The output of the create table command may include a table schema and parser selection that are stored for the data source. Upon execution of the create table command, the data source may be added to the distributed data warehouse service 180 and may be subject to queries submitted by a client.

As shown in 525, a query against the data source may be received, e.g., submitted by the client to the distributed data warehouse service 180. As shown in 530, the query may be executed against the data source. As a result of the query, one or more elements of data may be retrieved from the data source using the selected parser. Additionally, the one or more elements may be transformed into the output table using the table definition.

Figure 5B:
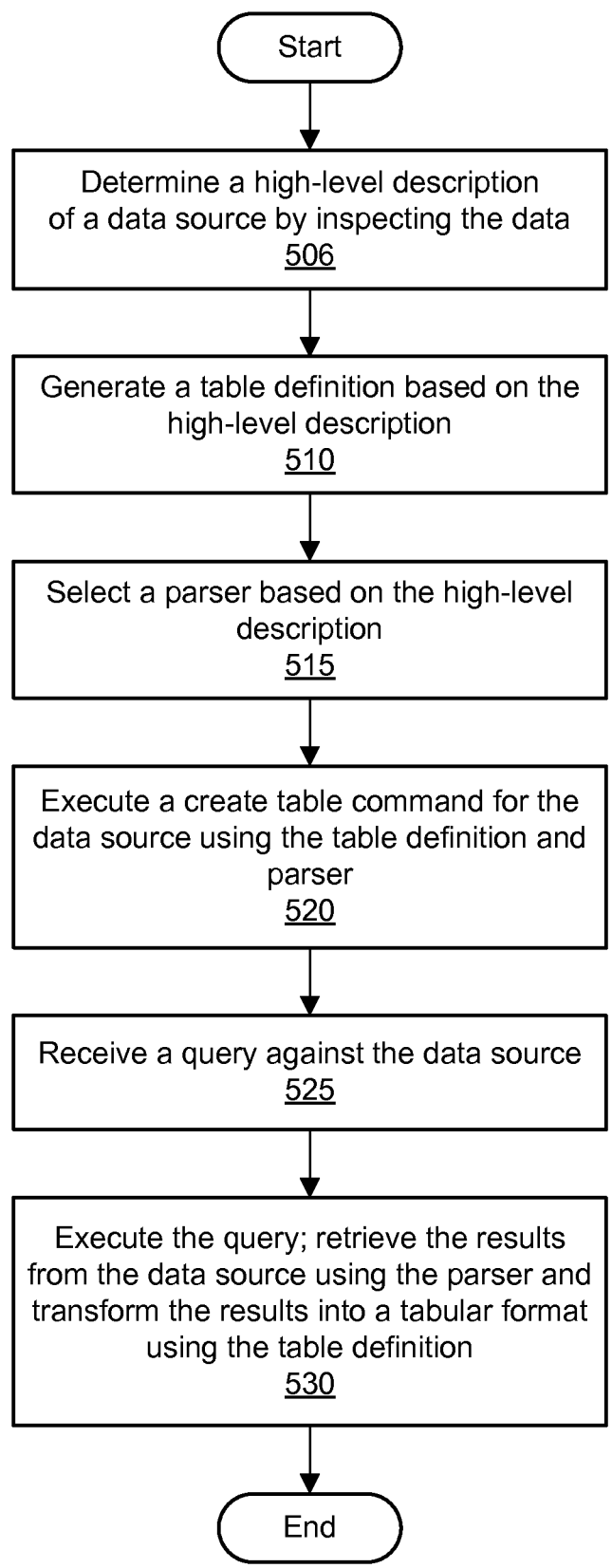

FIG. 5B is a flowchart illustrating a method for automatic table schema generation, according to one embodiment. As shown in 506, at least a portion of a high-level description of a data source is determined automatically by the distributed data warehouse service 180. In one embodiment, the high-level description may be determined by inspecting all or part of the data or metadata in the data source, e.g., to determine the data type of the data source such as "csv," "json," etc. For example, a portion of the data source may be searched for particular strings or structural elements that are typically associated with particular data types. In one embodiment, the high-level description of the data source may include data usable to create a mapping of the data in the data source to a tabular format. For example, the high-level description may include, for each of the one or more columns of the tabular format, a column name and a data type. In one embodiment, one or more of the data types of the columns may be determined automatically by inspecting at least a portion of data in the data source. In one embodiment, the column headings may be determined automatically by inspecting the data source to find a listing of the column headings. The high-level description may be determined before a query against the data source is submitted by a client. In one embodiment, the high-level description may be determined automatically, and the high-level description may then be presented to the client (e.g., in a graphical user interface or other suitable user interface) for ratification or modification. Accordingly, some portions of the high-level description may be determined automatically (e.g., through inspection or examination of the data source), and other portions of the high-level description may be provided by the client that seeks to add the data source to the distributed data warehouse service 180.

As shown in 510, a table definition for the data source is generated. The table definition may be generated automatically based on aspects of the high-level description of the data source. The table definition may provide a mapping of fields or other elements of the data source to one or more columns of a table. Accordingly, the table definition may include a column name and a data type for each of the one or more columns. In one embodiment, the table definition is determined based on one or more column names and/or column data types received from the client.

As shown in 515, a parser for the data source is selected. The parser may be selected from a set of predefined parsers. The parser may be selected based on the high-level description of the data source. The parser may include a serializer and a deserializer for the data source. In one embodiment, one or more parameters or arguments for the parser may also be selected based on the high-level description of the data source.

In one embodiment, the table definition, the selected parser, and the optional parameters or arguments for the parser may be generated as part of a create table command. As shown in 520, the create table command may be executed by the distributed data warehouse service 180. The output of the create table command may include a table schema that is stored for the data source. Upon execution of the create table command, the data source may be added to the distributed data warehouse service 180 and may be subject to queries submitted by a client.

As shown in 525, a query against the data source may be received, e.g., submitted by the client to the distributed data warehouse service 180. As shown in 530, the query may be executed against the data source. As a result of the query, one or more elements of data may be retrieved from the data source using the selected parser. Additionally, the one or more elements may be transformed into the output table using the table definition.

Configurable Workflows in a Data Pipeline

In various embodiments, a data pipeline may provide one or more services allowing users to schedule and manage data-driven workflows. In some embodiments, the data pipeline may provide clients with access to functionality for creating, configuring, and executing defined workflows that manipulate source data in defined manners, such as under the control of a configurable workflow service that is available to multiple remote clients. In at least some embodiments, a remote client may interact with a configurable workflow service over one or more public networks in order to create and configure a defined workflow that is provided by the configurable workflow service for use by the client. Such a defined workflow may, for example, include multiple interconnected workflow components that are each configured to perform one or more specified types of data manipulation operations on a specified type of input data. After a client has configured such a defined workflow, the configurable workflow service may further execute the defined workflow at one or more times and in one or more manners, such as in some situations by provisioning multiple computing nodes provided by the configurable workflow service to each implement at least one of the workflow components for the defined workflow, and by retrieving defined types of source data and providing it to workflow components in defined manners. Thus, in at least some embodiments, some or all of the described techniques are automatically performed by embodiments of a configurable workflow service, such as may be implemented by one or more software modules executing on one or more configured computing systems, as described in greater detail below.

As noted above, a defined workflow may include multiple workflow components, which may be of multiple types in at least some embodiments, including one or more data source workflow components that correspond to input data for the defined workflow, one or more data manipulation workflow components that correspond to defined data transformations or other manipulations to be performed on data, and one or more data destination workflow components that correspond to providing output data from the defined workflow. In addition, interconnections may be defined between workflow components that correspond to data flows between workflow components, such that data output from a first component may be supplied as input to a second component, with that relationship being represented as a connection from the first component to the second component. In at least some embodiments and situations, the configurable workflow service may provide a group of predefined workflow components that a client may select and use in a defined workflow of the client, optionally after being configured in one or more manners. Furthermore, in at least some embodiments and situations, the configurable workflow service may enable a client to supply or otherwise define some or all workflow components to be used in a defined workflow of the client.

Each data source workflow component that is defined for a workflow may correspond to data obtained from an indicated data source, and each component may include information such as a storage location for the data and optionally additional access information related to the storage location (e.g., login information associated with the client, a particular search or other information to use to identify data to be used, such as metadata and/or data contents, etc.). In some embodiments, the configurable workflow service may provide internal storage locations for use by clients in storing their source data, with a particular data source corresponding to such an internal storage location, while in other embodiments and situations, a particular data source may be external to the configurable workflow service, such as one or more network-accessible storage systems that are provided by or otherwise controlled by the client, one or more online storage services, one or more online data generation services, etc. A non-exclusive list of examples of online storage services that may be used include the following: Amazon Simple Storage Service (S3) that stores object data of various types, Amazon Relational Database Service (RDS) that provides relational database functionality, Amazon SimpleDB that provides database functionality to store key-value pairs, Amazon DynamoDB service that provides NoSQL database functionality, Amazon Elastic Block Store (EBS) that provides access to raw block storage devices (e.g., mounting a virtual local block storage device on a target computer system), etc. A non-exclusive list of examples of online data generation services includes an RSS feed, the Amazon Cloudwatch Service that provides monitoring functionality for executing applications and services and generates corresponding information, etc. Data sources may thus be of various forms, such as a relational or other database (e.g., the HBase open-source distributed database, the BigTable distributed database, the MongoDB database system, the Apache Cassandra distributed database management system, etc.), a hash table, a file system, an object store, etc., optionally implemented in a distributed manner. A non-exclusive list of examples of data groups that may be obtained from a data source includes a file (e.g., a web server log), a database row or other record, a stored data object, a streamed group of data, etc.

Thus, in some situations and embodiments, a particular defined workflow may obtain and use data from multiple data sources, with some or all of the data sources optionally being external to the configurable workflow service. In addition, the configurable workflow service may optionally predefine one or more types of data source workflow components, such as to correspond to a particular internal storage mechanism of the configurable workflow service, to correspond to one or more particular online storage services (e.g., online storage services that are integrated with or otherwise affiliated with the configurable workflow service, or that instead are unaffiliated with the configurable workflow service), etc. Similarly, a client may optionally define one or more data source workflow components, such as to correspond to a client-specific storage location, to an online storage service without a predefined data source workflow component, etc.

Each data manipulation workflow component that is defined for a workflow may correspond to one or more defined data transformations or other manipulations on data that is input to the data manipulation workflow component. In addition, the output from a data manipulation workflow component may be provided to a data destination workflow component (and thus to be provided to a client), or instead may be intermediate data that is provided to a next data manipulation workflow component, such as via one or more electronic messages, by storing the intermediate data in a storage location accessible to the next data manipulation workflow component (e.g., using one or more storage locations provided by the configurable workflow service). Defined data manipulations may be of various forms, including a defined type of calculation on one or more groups of input data, aggregation of multiple groups of input data in one or more manners, selection of a subset of one or more groups of input data, moving data from one storage location to another, etc. A non-exclusive list of example data manipulations includes performing a distributed data copy, performing one or more SQL (Structured Query Language) transforms, performing one or more map and/or reduce functions within a map-reduce architecture (e.g., for use within the Amazon Elastic MapReduce service), using a scientific or mathematics package (e.g., MatLab, Mathematica, etc.), executing a client-supplied script or other program, etc. Thus, in some situations and embodiments, a particular defined workflow may perform multiple data manipulation operations via multiple defined data manipulation workflow components, using predefined and/or client-defined data manipulation workflow components.

Each data destination workflow component that is defined for a workflow may correspond to output data provided from the defined workflow to one or more storage locations and in one or more manners. The types of storage locations used by data destination workflow components (and corresponding information stored for such data destination workflow components) may be similar to or the same as for data source workflow components in at least some embodiments, including storage locations that are internal to and/or external from the configurable workflow service. In addition, in at least some embodiments and situations, particular data destination workflow components may include operations to prepare and/or provide output data in a particular manner, such as by generating particular types of reports, by sending output data via one or more types of defined electronic communications, etc. Thus, in some situations and embodiments, a particular defined workflow may provide multiple types of output data in multiple manners via multiple defined data destination workflow components, using predefined and/or client-defined data destination workflow components.

In addition, a client may define a workflow in various manners in various embodiments. For example, an embodiment of a configurable workflow service may provide one or more interfaces for use by a client, such as a defined GUI ("graphical user interface"), a defined API ("application programming interface"), and/or a defined CLI ("command line interface"). When using a provided GUI, a user representative of a client may, for example, use a visual editor to specify particular workflow components for a workflow being defined, and may further specify interconnections between particular workflow components corresponding to data flows. In at least some such embodiments, the configurable workflow service may represent the defined workflow as a graph that logically represents the workflow, with various graph nodes corresponding to particular workflow components.

The configurable workflow service may further implement a defined workflow for a client in various manners and at various times. In some embodiments, each time that a defined workflow is to be used, the configurable workflow service instantiates a physical copy of the logical graph representing the defined workflow, such as by using multiple computing nodes that each implement at least one workflow component for the defined workflow. In particular, in at least some embodiments, some or all of the computing nodes are provisioned by the configurable workflow service to implement particular workflow components (e.g., to load corresponding software and/or data on those computing nodes), such as to each execute a workload worker process corresponding to each such implemented workflow component. The computing nodes may have various forms in at least some embodiments, including a separate physical computer system, a separate virtual machine (e.g., one of multiple virtual machines hosted on a physical computer system), a group of multiple physical computer systems that are operating in a distributed manner, etc. Some or all such computing nodes used for a defined workflow may in some embodiments be selected from a plurality of computing nodes provided by the configurable workflow service for use by clients. In addition, some or all such computing nodes may be provided by or otherwise controlled by the client and/or may be provided by one or more online execution services, whether instead of or in addition to computing nodes provided by the configurable workflow service. A non-exclusive list of example online execution services that may be used include the Amazon Elastic Compute Cloud ("EC2") program execution service, the Amazon Elastic MapReduce service for performing distributed map-reduce operations (e.g., by using a cluster of computing systems from the service to represent or implement a computing node for the configurable workflow service), etc. In addition, when a particular defined workflow is to be implemented multiple times, the configurable workflow service may in some embodiments maintain the provisioning and availability of some or all computing nodes for the defined workflow between two or more such times (e.g., in accordance with instructions from the client, based on an automated determination by the configurable workflow service, etc.). In other embodiments, the configurable workflow service may release some or all such computing nodes to be available after an implementation and provide the same types of provisioning of computing nodes (optionally different computing nodes) for a next implementation.

A defined workflow may further have additional types of associated information in at least some embodiments. For example, a client may specify information that indicates when to implement a defined workflow, e.g., based on a client instruction for immediate implementation, by scheduling future implementation at one or more defined future times, by scheduling one or more future implementations when one or more defined criteria are satisfied (e.g., based at least in part on availability of particular source data), etc. Defined criteria may be specified in various manners, such as criteria associated with particular workflow components or instead with the defined workflow as a whole. For example, a particular workflow component may have defined pre-condition criteria to be evaluated to determine when to execute the workflow component. Additionally, a particular workflow component may have defined post-condition criteria to be evaluated to determine when to complete execution and/or where to provide the output data (e.g., to a next workflow component, to an intermediate storage location, etc.). In some embodiments and situations, a defined workflow may further have one or more associated alarms that may be used to provide notification to a client (or to perform other activities) when one or more specified criteria are satisfied or are not satisfied (e.g., if a defined workflow is not implemented at a particular time, such as if particular source data is not available).

The configurable workflow service may further be a fee-based service in at least some embodiments, such that clients of the configurable workflow service are customers that pay fees to the provider of the configurable workflow service for at least some of the functionality provided by the configurable workflow service. In addition, when one or more online storage services and/or online execution services are used by the configurable workflow service as part of implementing a particular defined workflow for a particular client, the provider(s) of such other services may also optionally charge fees for such use, whether via the configurable workflow service or directly to the client.

Thus, use of the configurable workflow service in the data pipeline may provide various benefits in various embodiments, including enabling a client to schedule gathering data from multiple sources at particular times or otherwise when particular criteria are satisfied, performing defined types of data manipulation operations on the source data, and providing output data produced by the defined workflow in various manners. Additional benefits are discussed elsewhere herein, and will otherwise be appreciated by those skilled in the art.

In one embodiment, configurable workflow service ("CWS") workflows (also referred to as "pipelines") are defined via a configuration language that enables description of nodes (also referred to as "objects") that form a pipeline. In one embodiment, a pipeline may include objects from any of the following categories: Data Sources, Activities, Pre-Conditions and Post-Conditions, Schedules, and Alarms. In one embodiment, a Data Source is an input to or an output from a data manipulation workflow component (also referred to as an "activity" in this example embodiment).

In one embodiment, an Activity is an operation to be performed, such as data processing transformations, data copies, etc. Activities can be set to alarm on certain states and to retry multiple times on failure. In one embodiment, predefined activities may include Copy, SQLTransform, HiveQLTransform, ElasticMapReduceTransform, CommandLineTransform, and other suitable activities.

In one embodiment, a Pre-Condition or a Post-Condition is an action associated with a Data Source that evaluates to true when the Data Source is considered available and/or well formed. Pre-conditions that complete successfully enable a following Activity that consumes a Data Source as an input to be run. Post-conditions that complete successfully may enable an Activity that creates a Data Source to be considered successfully completed.

In one embodiment, a Schedule is an attribute of a Data Source that describes the periodicity of the data or an attribute of an Activity that defines the periodicity of when it runs. The periodicity can be at a granularity of one or more minutes, one or more hours, one or more days, one or more weeks, one or more months, etc.

In one embodiment, an Alarm describes a message to be published to a notification service (e.g., Amazon's SNS, or Simple Notification Service), sent via an electronic communication (e.g., e-mail), etc. Pipelines and individual Activities may have an Alarm defined for failure and/or success.

For illustrative purposes, some embodiments are described below in which specific instances of defining and implement workflows are provided in specific ways, including with respect to specific types of data, specific types of data manipulation operations, and specific types of storage services and execution services. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

Figure 6:
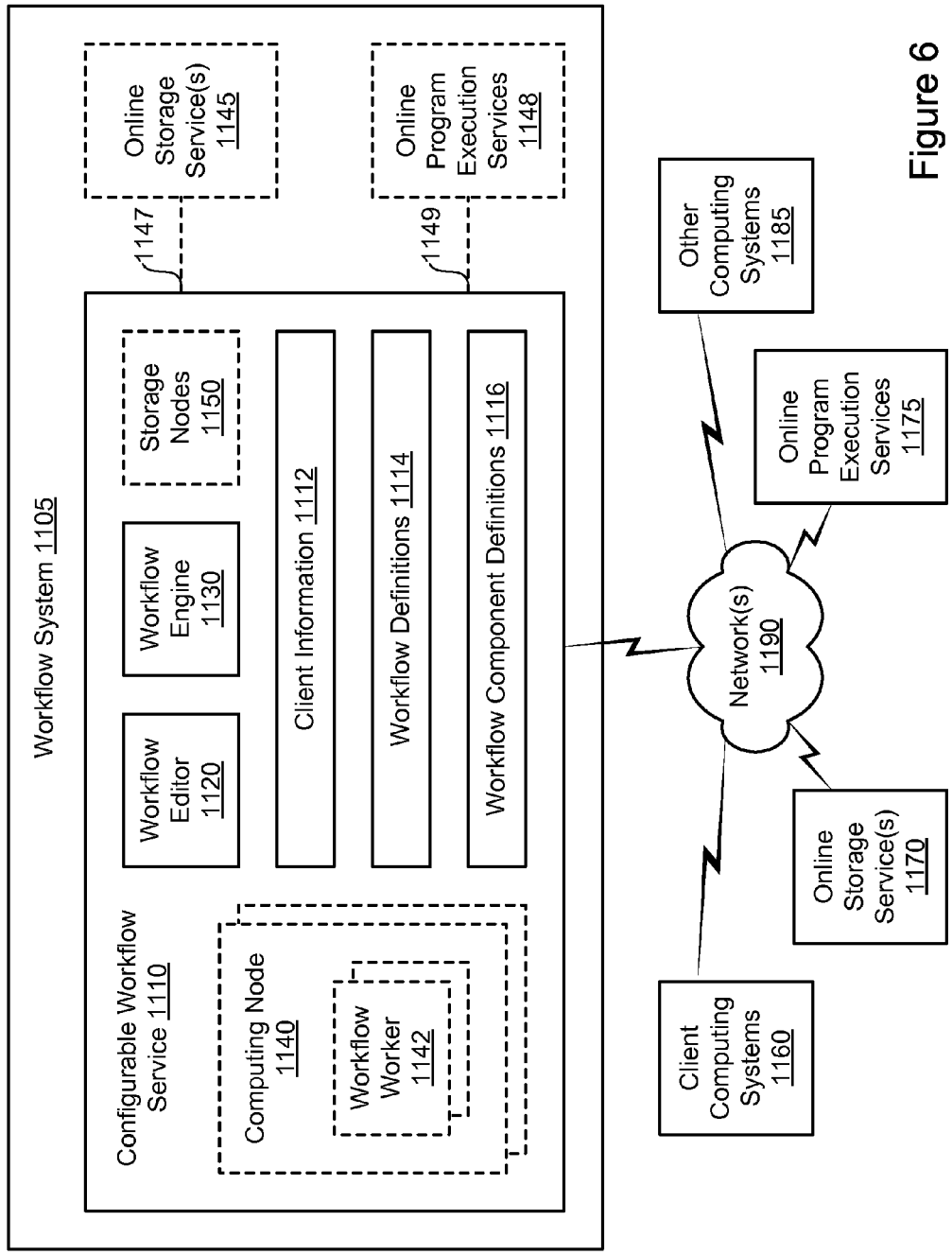
FIG. 6 illustrates an example embodiment of a configurable workflow service that provides functionality to enable remote clients to create, configure and execute defined workflows that manipulate source data in defined manners, according to one embodiment.

FIG. 6 is a network diagram that illustrates an example embodiment of a configurable workflow service 1110 that manages creation and execution of defined workflows for various clients of the configurable workflow service. As part of implementing a defined workflow, the configurable workflow service 1110 further provisions particular computing nodes to each perform specified activities corresponding to the defined workflow. In some embodiments, the configurable workflow service 1110 optionally provides a group of computing nodes 1140 on which defined workflows for clients may be executed. In other embodiments, some or all of the computing nodes used by the configurable workflow service may be provided externally to the configurable workflow service, such as by a client on whose behalf the defined workflow is implemented, by one or more online execution services, etc. In addition, in some embodiments, the configurable workflow service 1110 optionally includes one or more storage nodes 1150 on which data may be stored to facilitate the execution of defined workflows. For example, the storage nodes 1150, if present, may be used to store intermediate data results that are produced during execution of a defined workflow, and in some embodiments may further be used to store source data that is provided to a defined workflow and/or final output data produced by a defined workflow. While not illustrated in FIG. 6, the configurable workflow service may be implemented using one or more configured computing systems, as described in greater detail with respect to FIG. 7 and elsewhere.

FIG. 6 further illustrates one or more networks 1190, and various client computing systems 1160 via which clients of the configurable workflow service 1110 may interact with the service 1110 to define and execute workflows. The network(s) 1190 of FIG. 6 may include any appropriate network or combination of networks, including an intranet, the Internet, one or more private networks with access to and/or from the Internet, a cellular network, a local area network, or any other such network or combination thereof. Communications over the networks may be enabled by wired or wireless connections and combinations thereof.

In some embodiments, the configurable workflow service 1110 may provide one or both of a GUI (not shown) and/or an API (not shown), such as to enable clients to perform various interactions with the service 1110. For example, a user representative (not shown) of a particular client may locally interact with one of the client computing systems 1160 to cause further interactions to occur with the configurable workflow service 1110 over the network(s) 1190. The user may, for example, interact with a workflow editor module 1120 of the configurable workflow service, via which the user may define one or more workflows of interest for the client. As part of the interactions with the user, the configurable workflow service 1110 may store various client information 1112 regarding the client and optionally the user representative, and may store a particular definition of a newly defined workflow for the client as part of information 1114. In some embodiments, the defining of a particular workflow may include actions by the user in selecting one or more defined workflow components and specifying the interactions between those workflow components, such as by using one or more predefined system-provided workflow component definitions 1116. In other embodiments, the configurable workflow service 1110 may not provide any such system-provided predefined workflow components. As part of defining a new workflow, the user may further specify one or more source locations at which source data is to be retrieved and used for the workflow definition, and one or more destination locations to which data that is produced by the defined workflow will be provided. The various information 1112, 1114, and 1116 used by the configurable workflow service 1110 may further be stored on one or more systems that support or provide the configurable workflow service 110, such as a database of the configurable workflow service, although such systems are not illustrated with respect to FIG. 6.

In addition, the user representative of the client may optionally in some embodiments define one or more new workflow components as part of defining a new workflow, and if so, such client-defined workflow components may further have definition information stored in information 1116 in at least some embodiments. While a client-defined workflow and any client-defined workflow components may in some embodiments be treated as private unless otherwise specified by the client (e.g., to be accessible or otherwise visible only to that client unless other specified), in other embodiments and situations, at least some such client-specific information may instead be made available to other clients in specified circumstances, such as to enable other clients to use some or all of the client's defined workflow components and/or workflows (e.g., for a fee or for other benefits provided to the client who defined such information, if the client who defined such information approves use by others, etc.). In a similar manner, source data used by a client's defined workflow and final output data produced by a client's defined workflow may in at least some embodiments be treated as private to that client unless otherwise specified, although in other embodiments some or all such source data and/or final output data may instead be made available to other clients in specified circumstances (e.g., for a fee or for other benefit to the client with which that data is associated, if the client associated with such information approves use by others, etc.).

When a client indicates one or more storage locations from which source data may be obtained and/or to which final output data may be provided for a defined workflow, such storage locations may have various forms in various embodiments, as discussed in greater detail elsewhere. As one example, in at least some embodiments, the configurable workflow service may be integrated with or otherwise affiliated with one or more particular optional online storage services 1145, such as to form a single system 1105 (e.g., a single system that is operated by a single entity). If so, interactions 1147 with such optional online storage services 1145 may be performed to retrieve source data and/or to store final output data. Furthermore, in at least some embodiment, intermediate data results that are generated during execution of a workflow may similarly be stored in such online storage services 1145, such as to be produced by a first part of the defined workflow and to be later accessed and used by a second defined part of the workflow, whether in addition to or instead of one or more optional storage nodes 1150. Moreover, in at least some embodiments and situations, one or more online storage services 1170 are available over the network 1190 to the client computing system 1160 and to the configurable workflow service 1110, and may be used in a similar manner over the network(s) 1190, whether in addition to or instead of some or all of the optional online storage services 1145. In addition, in at least some embodiments and situations, a particular client may provide one or more client-specific storage systems or other storage locations using one or more other computing systems 1185, which may similarly be used over the network(s) 1190.

After a client has interacted with the configurable workflow service to define a workflow, the client may further interact with a workflow engine module 1130 of the configurable workflow service to initiate execution of the defined workflow. The execution of a particular workflow may be initiated in various manners, such as to be performed immediately upon a corresponding instruction from the client, to occur at a specified future time or when other specified criteria (such as for one or more defined preconditions) are satisfied that will initiate execution of the workflow, etc. As with the workflow editor module 1120, the workflow engine module 1130 may in some embodiments provide a GUI interface and/or and API interface for use by clients. When the execution of a defined workflow is initiated, the workflow engine module 1130 in the example embodiment retrieves workflow definition information for that defined workflow from the information 1114, and initiates the execution of the defined workflow on one or more computing nodes. In particular, the workflow definition may be constructed with various logical nodes that each correspond to defined operations and are interconnected in various manners, and the workflow engine module 1130 may select particular computing nodes to use to perform particular such operations, as well as to further perform activities to provision and initiate execution of corresponding workflow worker processes on each such selected computing node. As part of provisioning such computing nodes and/or of executing workflow worker processes on the computing nodes, additional interactions with one or more storage locations may be performed to obtain input data to be used and/or to store results data that are produced, including for intermediate results data for use by other workflow worker processes of the defined workflow.

Some or all of the computing nodes used to implement a defined workflow may, for example, be selected from optional computing nodes 1140 provided by the configurable workflow service 1110, if present, and workflow worker processes 1142 may be executed on those computing nodes to implement the defined operations. In other embodiments, the workflow engine module 1130 may use computing nodes that are not provided by the configurable workflow surface 1110, whether instead of or in addition to the optional computing nodes 1140. For example, in some embodiments and situations, a particular client may provide or otherwise control one or more other computing systems 1185, and the workflow engine 1130 may configure and use such other computing systems 1185 as computing nodes for use in executing that client's defined workflow. In addition, in some embodiments, one or more online program execution services 1148 and/or 1175 may be available for use in executing programs in various manners, and if so may be used to provide computing nodes (not shown) to execute some or all of a particular client's defined workflow. For example, the workflow engine module 1130 may provision and initiate execution of particular workflow worker processes on particular computing nodes provided by such online program execution services. As one example, in at least some embodiments, the configurable workflow service may be integrated with or otherwise affiliated with one or more particular optional online program execution services 1148 (whether in addition to or instead of one or more optional storage services 1145), such as part of a single system 1105 as described above. If so, interactions 1149 with such optional online program execution services 1148 may be performed to provision computing nodes, initiate execution of particular workflow components, receive output data produced by particular workflow components, etc.

In other embodiments, the configurable workflow service 1110 may perform additional techniques, such as to generate and provide particular types of source data for defined workflows, to perform additional activities with respect to managing final output data produced by clients' defined workflows, etc. In addition, the configurable workflow service 1110 may be implemented in some embodiments based on software instructions that execute on one or more server computing systems to program or otherwise configure the server computing system(s) to perform some or all of the described techniques, such as to program one or more hardware CPU processors (not shown) of the server computing system(s). Such software instructions may, for example, be used to implement the modules 1120 and/or 1130, or instead the functionality of the configurable workflow service may be provided using other types of modules.

In this manner, the configurable workflow service 1110 provides various benefits to various external clients, including to enable the clients to define workflows that may be executed using computing and storage resources of the configurable workflow service 1110 in part or in whole, to interact with various types of online data sources to obtain data to be manipulated, and to provide output data that is produced for storage or other use. Additional details related to particular operations of the configurable workflow service 1110 are included elsewhere herein.

Although the foregoing example embodiment of FIG. 6 is described with respect to a configurable workflow service 1110 that provides various types of functionality in conjunction with one or more client systems that each may have one or more associated users, it will be appreciated that various other embodiments may exist. For example, in at least some embodiments and situations, a client may represent an organization or other group (e.g., a company that has multiple people instead of an individual person). Thus, a client entity may have various forms in various embodiments.

In some embodiments, the configurable workflow service 1110 and optionally any online storage services and/or online program execution services that are used may each operate according to one or more fee-based structures or agreements. For example, access to some or all of the described techniques from the configurable workflow service 1110 may in some embodiments be provided in a fee-based or other paid manner to a provider or operator of the configurable workflow service 1110 and/or to at least some client systems that use described techniques of the configurable workflow service 1110. As one example, clients of the configurable workflow service 1110 may pay one-time fees, periodic (e.g., monthly) fees, and/or one or more types of usage-based fees to use functionality provided by the configurable workflow service 1110. Such fees may be based on one or more factors and activities, such as indicated in the following non-exclusive list: based on a quantity and/or type of interactions performed to define a particular workflow; a size and/or type of a defined workflow and/or of some or all of its defined workflow components; based on usage of a defined workflow, such as a measure of computing resources used in executing a defined workflow (e.g., a quantity of computing nodes used), a measure of processor capability used (e.g., CPU cycles), an amount of time that occurs during the execution of the defined workflow, activities in provisioning computing nodes for a defined workflow, amount of time during which computing nodes that are provisioned for a defined workflow are unavailable for other use, such as while those computing nodes wait for source data to be available or other preconditions to be satisfied, based on a quantity of data that is stored and/or transferred, such as based on a size of the data, an amount of time of the storage, etc.; based on content or other characteristics of particular data groups that are stored, manipulated and/or produced; etc.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more computing devices configured to implement a plurality of computing resources, wherein the plurality of computing resources comprise a data source; and
    one or more computing devices comprising at least one processor and at least one memory, wherein the at least one memory stores program instructions executable by the at least one processor to implement a query service, wherein the program instructions are executable by the at least one processor to:
        receive a description of the data source;
        generate a table definition for the data source based on the description of the data source, wherein the table definition maps the data source to one or more columns of an output table;
        select a parser for the data source, wherein the parser is selected from a set of predefined parsers based on the description of the data source, and wherein the parser comprises a serializer and a deserializer for the data source;
        receive, from a client, a query against the data source, wherein the query is expressed in a query language and describes one or more attributes of data to be obtained from the data source;
        retrieve, from the data source, one or more elements of data responsive to the query using the selected parser, wherein the one or more elements of data are selected from the data source based at least in part on the one or more attributes of data in the query; and
        transform the retrieved one or more elements into the output table based on the table definition.

2. The system as recited in claim 1, wherein the description of the data source comprises data indicative of a data type of the data source and, for each of the one or more columns of the output table, a respective column name and a respective column data type.

3. The system as recited in claim 1, wherein the program instructions are further executable by the at least one processor to:
generate a create table command based on the table definition and the selected parser.

4. The system as recited in claim 1, wherein the program instructions are further executable by the at least one processor to:
select one or more parameters for the parser based on the description of the data source.

5. A computer-implemented method, comprising:
determining, by one or more computer processors, a description of a data source;
generating, by one or more computer processors, a table definition based on the description of the data source, wherein the table definition maps one or more fields in the data source to one or more columns of an output table;
selecting, by one or more computer processors, a parser for the data source, wherein the parser is selected from a set of predefined parsers based on the description of the data source; and
executing a query against the data source, wherein the query is expressed in a query language and describes one or more attributes of data to be obtained from the data source, and wherein executing the query comprises:
retrieving one or more elements of data from the data source using the selected parser, wherein the one or more elements of data are selected from the data source based at least in part on the one or more attributes of data in the query.

6. The method as recited in claim 5, wherein executing the query against the data source further comprises:
transforming one or more elements of data from the data source into the output table based on the table definition.

7. The method as recited in claim 5, wherein the description of the data source comprises data indicative of a data type of the data source and, for each of the one or more columns of the output table, a respective column name and a respective column data type.

8. The method as recited in claim 5, further comprising:
generating a table creation command based on the table definition and the selected parser.

9. The method as recited in claim 5, further comprising:
selecting one or more parameters for the parser based on the description of the data source.

10. The method as recited in claim 5, wherein selecting the parser comprises selecting an input parser and an output parser.

11. A system, comprising:
at least one processor;
a storage system configured to implement a data source; and
a memory coupled to the at least one processor, wherein the memory stores program instructions, wherein the program instructions are executable by the at least one processor to:
determine a description of the data source;
determine a table schema using the description of the data source, wherein the table schema comprises a mapping to one or more columns of a table;
determine a parser for the data source using the description of the data source;
retrieve, from the data source, one or more elements of data responsive to a query using the selected parser, wherein the query is expressed in a query language and describes one or more attributes of data to be obtained from the data source, and wherein the one or more elements of data are selected from the data source based at least in part on the one or more attributes of data in the query; and
transform the one or more elements of data into a tabular format using the table schema.

12. The system as recited in claim 11, wherein the parser is selected from a set of predefined parsers, and wherein the parser comprises a serializer and a deserializer for the data source.

13. The system as recited in claim 11, wherein the program instructions are further executable by the at least one processor to:
select one or more parameters for the parser based on the description of the data source.

14. The system as recited in claim 11, wherein the description of the data source comprises data indicative of a data type of the data source and, for each of the one or more columns, a respective column name and a respective column data type.

15. The system as recited in claim 11, wherein, in determining the description of the data source, the program instructions are further executable by the at least one processor to:
receive the description of the data source from a client.

16. The system as recited in claim 11, wherein, in determining the description of the data source, the program instructions are further executable by the at least one processor to:
inspect at least a portion of contents of the data source.

17. The system as recited in claim 11, wherein, in transforming the one or more elements of data into the tabular format using the table schema, the program instructions are further executable by the at least one processor to:
generate a plurality of output tables.

18. A non-transitory, computer-readable storage medium storing program instructions computer-executable to perform:
receiving a description of a data source, wherein the description of the data source comprises an indication of a data type of the data source;
generating and executing a table modification command based on the description of the data source, wherein the table modification command comprises a table definition and a selection of a parser for the data source, wherein the table definition comprises a mapping of a data source to a tabular format;
retrieving query results from the data source using the selected parser, wherein the query results are responsive to a query expressed in a query language and describing one or more attributes of data to be obtained from the data source, and wherein the query results are selected from the data source based at least in part on the one or more attributes of data in the query; and
transforming the query results into the tabular format using the table definition.

19. The non-transitory, computer-readable storage medium as recited in claim 18, wherein the parser is selected from a set of predefined parsers based on the description of the data source, and wherein the parser comprises a serializer and a deserializer for the data source.

20. The non-transitory, computer-readable storage medium as recited in claim 18, wherein the program instructions are further computer-executable to perform:
selecting one or more parameters for the parser based on the description of the data source.

21. The non-transitory, computer-readable storage medium as recited in claim 18, wherein the description of the data source comprises, for each of one or more columns of the tabular format, a respective column name and a respective column data type.

22. The non-transitory, computer-readable storage medium as recited in claim 18, wherein the program instructions are further computer-executable to perform:

generating and executing one or more additional table modification commands based on the description of the data source, wherein each of the one or more additional table modification commands comprises a respective additional table definition and a respective additional selection of an parser for the data source.

* * * * *